(12) United States Patent
Hegde et al.

(10) Patent No.: US 10,958,951 B2
(45) Date of Patent: Mar. 23, 2021

(54) MEDIA SESSION MANAGEMENT

(71) Applicant: Sling Media Pvt. Ltd., Bangalore (IN)

(72) Inventors: Gajanan Hegde, Uttara Kannada (IN); Suhas Nayak, Bangalore (IN); Amey Shirali, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 15/871,876

(22) Filed: Jan. 15, 2018

(65) Prior Publication Data

US 2018/0262786 A1 Sep. 13, 2018

(30) Foreign Application Priority Data

Mar. 10, 2017 (IN) .............................. 201741008438

(51) Int. Cl.
| | |
|---|---|
| *H04N 21/23* | (2011.01) |
| *H04N 21/239* | (2011.01) |
| *H04N 21/854* | (2011.01) |
| *H04N 5/265* | (2006.01) |
| *H04L 29/06* | (2006.01) |
| *H04N 21/234* | (2011.01) |
| *H04N 21/2365* | (2011.01) |
| *H04N 21/434* | (2011.01) |

(52) U.S. Cl.
CPC ......... *H04N 21/2393* (2013.01); *H04L 65/60* (2013.01); *H04N 5/265* (2013.01); *H04N 21/2365* (2013.01); *H04N 21/23424* (2013.01); *H04N 21/4347* (2013.01); *H04N 21/854* (2013.01)

(58) Field of Classification Search
None
See application file for complete search history.

(56) References Cited

U.S. PATENT DOCUMENTS

| | | | |
|---|---|---|---|
| 6,075,571 A | 6/2000 | Kuthyar et al. | |
| 9,015,236 B1 | 4/2015 | Chamarti et al. | |
| 9,037,633 B2 | 5/2015 | Tukol et al. | |
| 9,043,391 B2 | 5/2015 | Husain et al. | |
| 9,973,785 B1* | 5/2018 | Yang | H04L 65/80 |
| 2003/0118014 A1* | 6/2003 | Iyer | H04N 5/782 |
| | | | 370/389 |
| 2008/0079801 A1 | 4/2008 | Eri | |
| 2017/0077437 A1* | 3/2017 | Kaida | H01L 51/5206 |

OTHER PUBLICATIONS

International Search Report and Written Opinion for PCT/IB2018/000074 dated Apr. 24, 2018 (11 pages).

* cited by examiner

*Primary Examiner* — Cai Y Chen
(74) *Attorney, Agent, or Firm* — Perkins Coie LLP

(57) ABSTRACT

A system includes a computer that is programmed to receive one or more media streams, each from a respective one of a one or more media capture devices, and to receive, from a client device, for each of the one or more media streams, state data including at least one of an active and a potential state of the media stream. The computer is further programmed to disconnect from the client device, and then, upon reconnecting to the client device, to provide at least one of the media streams and the state data to the client device.

20 Claims, 5 Drawing Sheets

MEDIA SESSION MANAGEMENT

CROSS-REFERENCE TO RELATED APPLICATIONS

This patent application claims priority to and all the benefits of Indian Provisional Patent Application No. 201741008438, filed on Mar. 10, 2017, entitled "MEDIA SESSION MANAGEMENT," incorporated herein by reference in its entirety.

BACKGROUND

Usage of streamed media data such as video data has increased rapidly. Videos are used for instructional purposes, to record and view sports events, to share personal and family events, to sell real estate, etc. Users may wish to mix data from multiple input data streams into a single output data stream to view immediately or to store for later viewing. A media production device can be used to receive, broadcast, and/or mix data from multiple input data streams based on user inputs.

DETAILED DESCRIPTION

Introduction

Figure 1:
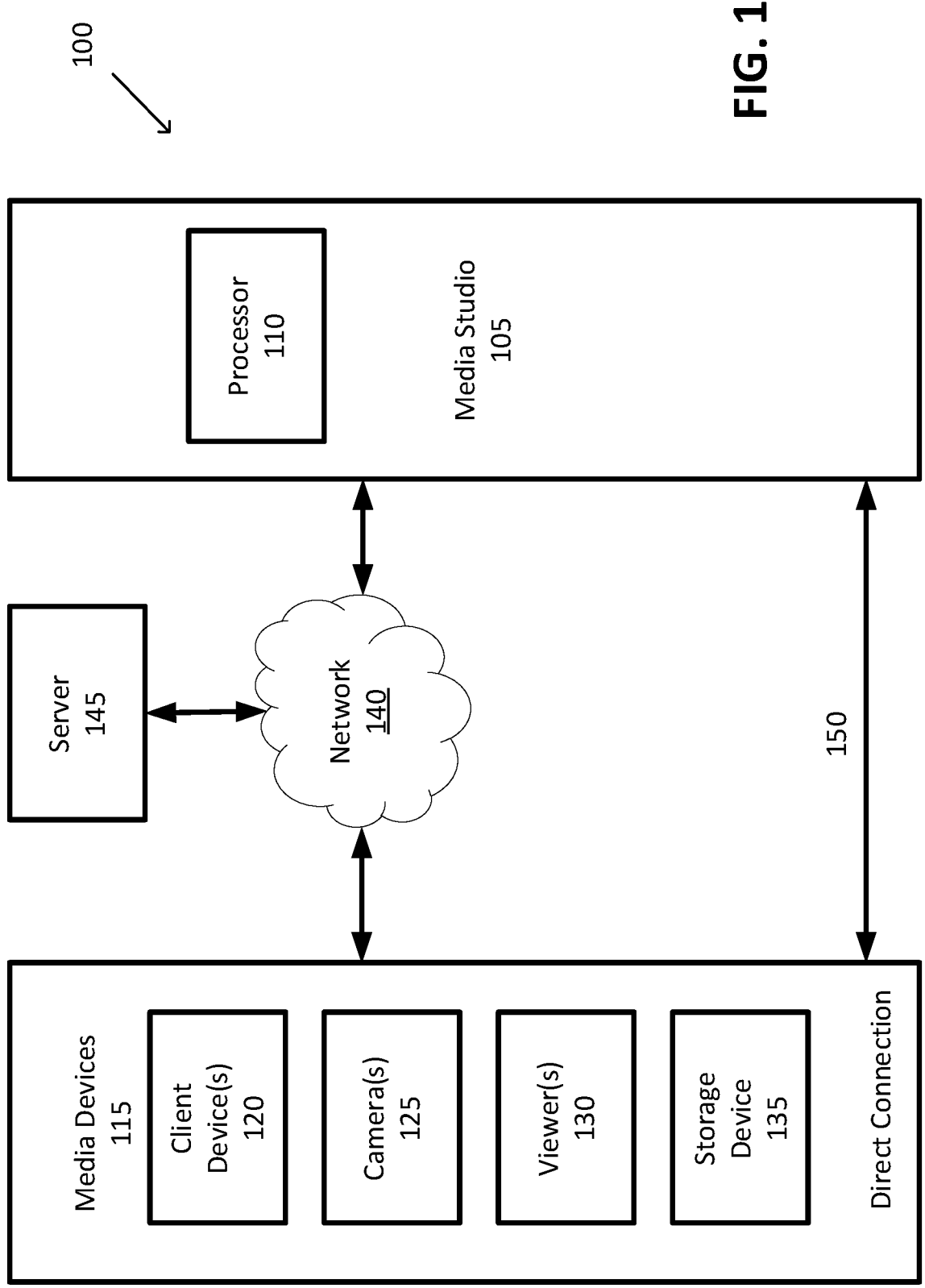
FIG. 1 is a block diagram of an exemplary media processing system for capturing and mixing multiple media streams into an output media stream.

Disclosed herein is a system including a computer that is programmed to receive one or more media streams, each from a respective one of a one or more media capture devices, receive, from a client device, for each of the one or more media streams, state data including at least one of an active and a potential state of the respective media stream, disconnect from the client device, and then, upon reconnecting to the client device, provide at least one of the media streams and the state data to the client device.

The computer may be further programmed to, upon reconnecting to a second client device, provide the media stream to the second client device.

The computer may be further programed to, upon reconnecting to the second client device, provide the state data to the second client device.

The state data may further include a position of the media stream in a client device user interface.

The computer may be further programmed to, based on an instruction received from the client device, stream the media to an output device that is one of a recording device, a display device, and a web-based streaming service.

The computer may be further programmed to output data, including a predicted event, to the client device, save the outputted data in a computer memory, upon determining that the client device failed to display the outputted data, and resend the data to the client device, upon determining that at least one of a new connection between the client device and the computer is established and an application associated with controlling the computer is activated on the client device.

The computer may be further programmed to suppress provision of one or more of the media streams for which state data specifies the potential state.

Connecting and reconnecting with the client device may occur when an application that receives the one or more media streams is activated on the client device.

The system may further include the client device, programmed to request the state data from a server computer upon determining that the client device lacks state data for at least one media stream being received from the server computer.

The client device may be further programmed to determine a state for one or more of the media streams based on received user input, and transmit the determined state for the one or more media streams to the server computer.

The client device may be further programmed to output an instruction to change a state of a media stream based on received user input.

The client device may be further programmed to activate an output device for a media stream based on received user input.

Further disclosed herein is a method including receiving, at a computer, one or more media streams, each from a respective one of a one or more media capture devices, receiving, from a client device, for each of the one or more media streams, state data including at least one of an active and a potential state of the media stream, disconnecting the computer from the client device; and then, upon reconnecting to the client device, providing at least one of the media streams and the state data to the client device.

The method may further include, upon reconnecting the computer to a second client device, providing the media stream to the second client device.

The method may further include, upon reconnecting the computer to the second client device, providing the state data to the second client device.

The method may further include outputting data, including a predicted event, to the client device, saving the outputted data in a computer memory, upon determining that the client device failed to display the outputted data, and resending the data to the client device, upon determining that at least one of a new connection between the client device and the computer is established and an application associated with controlling the computer is activated on the client device.

The method may further include suppressing provision of one or more of the media streams for which state data specifies the potential state.

The method may further include requesting the state data from a server computer upon determining that the client device lacks state data for at least one media stream being received from the server computer.

Further disclosed herein is a system including a client device programmed to provide for each of one or more media streams, state data including at least one of an active and a potential state of the media stream, and a media studio computer programmed to receive the one or more media streams and the state data, disconnect from the client device, and then, upon reconnecting to the client device, provide at least one of the media streams and the state data to the client device.

The media studio computer may be further programmed to output data, including a predicted event, to the client device, save the outputted data in a computer memory, upon determining that the client device failed to display the outputted data, and resend the data to the client device, upon determining that at least one of a new connection between the client device and the computer is established and an application associated with controlling the computer is activated on the client device.

Further disclosed herein is a computer that is programmed to execute any of above method steps.

Yet further disclosed herein is a computer-readable medium, storing program instructions for executing any of above method steps.

Exemplary System Elements

FIG. 1 shows a block diagram of an exemplary media processing system 100 for capturing and mixing multiple media streams into one or more output media streams. As used herein, a media "unit" is a smallest set of data that can be provided in a given digital media format, e.g., a single frame in MPEG and other video formats is a media unit. Further as used herein, a "stream" means a plurality of units of digital media data in a predefined format (e.g., MPEG, MP3, etc.) being provided to (input) or from (output) of a device.

The media processing system 100 may include a media studio 105, one or more media devices 115, and one or more viewers 130 such as a monitor. The one or more media devices 115 (or peripheral devices) may include a client device 120, e.g., a tablet computer, and may further include one or more cameras 125, one or more viewers 130, and one or more media storage devices 135. The media devices 115 may be remote or local to the media studio 105 and may be coupled to the media studio 105 via at least one of a network 140 and a direct wired or wireless connection. A server 145 may also be communicatively coupled to the media studio 105 and the media devices 115 via the networks 140.

The media studio 105 may include a processor 110 that is programmed to receive multiple media input streams, and to combine them into a multiview media item for viewing via the client device 120 and/or a viewer 130. The media input streams are sometimes referred to herein as individual media items. The multiview media item is an aggregated media content item that includes one or more of the media input items (or media input streams), arranged to be displayed substantially simultaneously on a user display, such as a touch screen. The media input items may be arranged such that they appear side-by-side, in rows, in a picture-in-picture format, etc. within the user display. In addition, the multiview media item may include, for example, a graphical user interface which is displayed, e.g., on the client device 120, and accepts user inputs. As described below, the media studio 105 may compress the multiview media item prior to providing it to one of the media devices 115 (e.g., data provided according to MPEG or the like is compressed) such as the client device 120 and/or the storage devices 135.

The media input streams may be visual and/or audio data such as videos captured by a video camera 125, sounds captured by a microphone, scenes from a security camera 125, etc. The media input streams may be, e.g., streamed data or static data such as single digital photographs. The media studio 105 is further operable to receive commands from the client device 120, and to generate a media output item, e.g., a multiview media item, (or media output stream) according to the received commands. The media output item may include data from one or more of the media input items.

The network 140 represents one or more mechanisms for delivering media content between the media studio 105 and the media devices 115. Accordingly, the network 140 may be one or more of various wired or wireless communication mechanisms, including any desired combination of wired, e.g., cable, fiber, etc., and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc.

In addition to the one or more networks 140, one or more wired or wireless direct connections 150 may be used to connect the media studio 105 to the media devices 115. Direct connections 150 may include e.g., Bluetooth, Universal Serial Bus (USB), high-definition multimedia interfaces (HDMI), custom serial interfaces, etc.

In particular, one or more high-definition multimedia interfaces (HDMI) may be used to transfer data between a media device 115 and the media studio 105, or from the media studio 105 to the monitor viewer 130. HDMI is a well-known, proprietary audio/video interface for transferring uncompressed video data and compressed or uncompressed digital audio data from an HDMI-compliant source device such as the media device 115 to a digital media processing device such as the media studio 105 or to a compatible computer monitor viewer 130.

The server 145 may be communicatively coupled to the media studio 105 and the media devices 115 via the network 140. The server 145 may include a communications circuit for communications via the network 140, and may further include memory and one or more processors configured to perform programs, i.e., sets of computer-executable instructions, stored in the memory. The server 145 may, e.g., receive media output items and store the media output items for future use.

Media content, such as the media input items (streams), media output items (streams), and/or multiview media items, is generally delivered via the network 140 in a digital format, e.g., as compressed audio and/or video data, and may include media data and metadata. For example, Moving Picture Experts Group (MPEG) refers to a set of standards generally promulgated by the International Standards Organization/International Electrical Commission MPEG. H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), HEVC/H.265, or according to some other standard or standards. For example, media content could be audio data formatted according to standards such as MPEG-2 Audio Layer III (MP3), Advanced Audio Coding (AAC), etc. Further, the foregoing standards generally provide for including metadata.

The media devices 115 such as cameras 125 may collect and transmit the media data, e.g., via the network 140, or via the direct connection 150, to the media studio 105. The collected media data may be, e.g., full high-definition (Full HD) data, providing an image resolution of 1920 by 1080 pixels.

The camera 125 captures media data, i.e., visual and sound data such as photographs and videos, and transmits the media data, e.g., via the network 140, to the media studio 105. Examples of cameras 125 include portable devices such as smartphones, tablets, laptops, digital cameras, etc., including one or more data collectors for collecting media data. The collected media data may include visual data and audio data. Examples of cameras 125 may further include security cameras, traffic cams, cameras transported by drones, etc.

The viewer 130 may be used to display media output data received from the media studio 105, and may include a display such as a liquid crystal display (LCD) or plasma display. The media data may be received, for example, via the network 140 or via the direct connection 150. Examples of the viewer 130 include mobile devices such as mobile phones, tablets, and laptops and may further include devices such as digital televisions. The viewer 130 may receive, e.g., full HD data, providing an image resolution of 1920 by 1080 pixels. Data formats with other resolutions may also be used.

The storage device 135 may store media data and provide an interface to allow the media studio 105 to access the data via the network 140 or via the direct connection 150. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), secure digital (SD) card, a hard drive, etc. Further, the media storage device 135 may include a processor, programmed, for example, to receive commands from the media studio 105. The processor may be further programmed, based on the commands, to retrieve media data items from data storage, and send the media data items to the media studio 105.

Communications between the storage device 135 and the media studio 105 may be performed via the network 140. Additionally or alternatively, communications may be performed via the direct connection 150. For example, the storage device 135 may be connected to the media studio 105 via a Universal Serial Bus (USB) port, or other wired or wireless interface.

The communications circuit may include a radio frequency (RF) transceiver for WiFi communications (typically 2.4 GHz or 5 GHz bands). The RF transceiver may communicate, for example, directly with a RF receiver included in the media studio 105. Additionally or alternatively, the communications circuit may include, e.g., an Ethernet interface, a Universal Serial Bus (USB) interface, a Bluetooth transceiver, a high-definition multimedia interface (HDMI), etc.

The media studio 105 may include an internal memory and a processor 110, the memory storing program code, i.e., computer-executable instructions, executable by the processor 110. The processor 110 is communicatively coupled to the media devices 115, e.g., via the network 140. The internal memory may be, e.g., read only memory (ROM), random access memory (RAM), flash memory, electrically programmable memory (EPROM), electrically programmable and erasable memory (EEPROM), embedded MultiMediaCard (eMMC), a hard drive, etc., and may be used to store programs executable by the processor 110, as well as to store, for example, data representing inputs from the user, instructions received from the client device 120, media data received from a remote media device 115, etc.

Additionally, the media studio 105 may include a high-definition media interface (HDMI) for connecting to a media device 115, such as a camera 125.

The media studio 105 processor 110 may output the media output item e.g., to viewers 130, to the client device 120, and/or to other display devices. Additionally or alternatively, the media studio 105 may output the media output item, e.g., to a server 145, or to storage devices 135, where the media output item may be stored for future use.

The media studio 105 processor 110 may, in some cases, generate a multiview media item. The multiview media item may include, for example, a picture-in-picture (PIP) display, wherein two or more of the media input items or streams are displayed simultaneously, e.g., side-by-side, within the multiview media item. The media studio 105 may transmit the multiview media item via the network 140 to one or more of the media devices 115, such as the client device 120 or the storage devices 135.

The media studio 105 processor 110 may be further programmed to receive commands from the client device 120. Based on the commands, the media studio 105 may generate a media output item or stream. The media studio 105 may select data from one or more of the media input items to include in the media output item. The media studio 105 may further, based on commands received from the client device 120, perform various media processing functions such as scaling, mixing, morphing compositing, adding overlays, tracking of specific people or objects, smart tagging etc. related to the generation of the media output item.

The client device 120 may be used to control the operation of the media studio 105. The client device 120 may include a memory and a processor, the memory storing program code, i.e., computer-executable instructions, executable by the processor. The client device 120 user interface may be communicatively coupled to the client device 120 processor and may include one or more input devices such as a microphone, buttons, a touchscreen display, a mouse, a keyboard, a gesture-recognition device, switches, etc., for receiving input from the user. The user interface may further include one or more output devices such as a display, lamps, speakers, etc. for communicating information to the user. All or a portion of the user interface may be physically separate from the client device. For example, the client device 120 may be a tablet computer which projects its output to another screen, (e.g., air-play), while the operator continues to control the media studio 105 from the tablet computer.

In addition to commands related to selecting media input items for display in the media output item, commands from the client device 120 may include instructions to perform functions such as scaling, mixing, morphing, compositing, adding overlays, etc. Further, commands from the client device 120 may include instructions to perform functions such as object tracking, image stabilization, etc.

Figure 2:
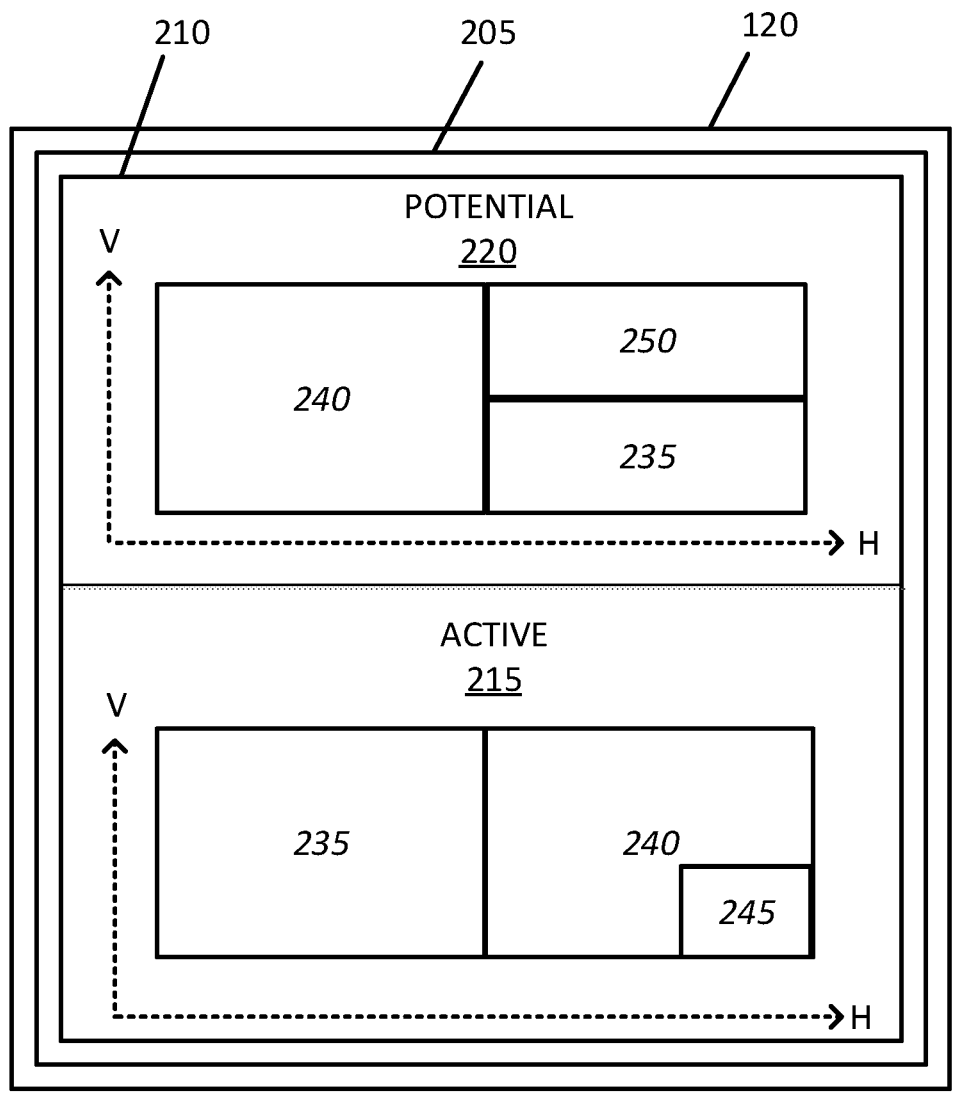
FIG. 2 is a graph showing a multiview media output item for viewing via a media device and/or a viewer.

FIG. 2 shows an example client device 120, e.g., a smart phone, having a user interface 205, e.g., a touch screen. In one example, a client device 120 may be programmed to receive entry from a user via an application window 210 displayed on the user interface 205. An application window 210 is typically a graphical user interface generated by application software executed in the client device 120 and/or a remote computer. The client device 120 may be further programmed to control the media studio 105 operation, e.g., mixing, scaling, etc., based on user input via the client device 120 user interface 205.

In the present example, the media studio 105 receives four media input items 235, 240, 245, 250. For example, a user of the client device 120 may select the media input items 235, 240, 245, via the user interface 205, to be included in the media output item, as shown in active stream 215 (further discussed below). The media studio 105 may generate a multiview media output item including the selected media input items 235, 240, 245, and transmit, e.g., via a network 140, the multiview media output item to the client device 120, and/or other client devices 120 or viewers 130. The media studio 105 processor 110 may be programmed to generate the media output item based on various commands received from the client device 120. For example, the received commands may include which media input items are selected, at which horizontal and/or vertical position H, V each of the selected media input items should be displayed, scaling of each selected media input item, whether picture-in-picture display of media input items is warranted, etc. The client device 120 may be programmed to generate the commands for the media studio 105 based on a session state, as described below.

A shown in FIG. 2, the client device 120 application window 210 may include a graphical depiction of a user sessions that includes an active media stream 215 and one or more potential media streams 220 (one being shown in FIG. 2 for ease of illustration) in operation of the media studio 105. A "session" in the present context is a session of application software executed on the client device 120, a session beginning upon instantiation of a user interface and/or a connection by the client device 120 to the media studio 105, e.g., opening an application window 210 on the client 120; a sessions ends when the connection is terminated and/or the user interface is closed, e.g., by minimizing the application window 210, turning off the client device 120, disconnecting the wireless communication between the network 140 and the client device 120, etc. Further, a session may include, and typically does include, multiple states. Further, a session state (or state), in the context of present disclosure, includes various information including a relationship of media output item and the media input items, as described in Table 1. For example, a state of an active media stream 215 may include commands that control a current status of the media stream 215 generation by the media studio 105, whereas a state of a potential stream 220 may include commands that are applied to media studio 105 upon activing the potential session stream 220.

Moreover, a "master state" herein refers to a plurality of session states for a specific user session in the media studio 105. For example, master state data may include state data associated with an active stream 215, state data associated with one or more potential stream(s) 220, a status of communication between a client device 120 and the media studio 105, status of any predicted events (as discussed below), a status and/or parameters of peripherals such as any media device 115 connected to the studio 105 such as cameras 125, etc. Each of the state data associated with the active stream 215 and/or potential stream(s) 220 may include a data structure such as one shown in Table 1. The processor 110 may be programmed to maintain, e.g., store and/or keep track of changes of, the master state upon, e.g., booting up the media studio 105. Additionally or alternatively, the processor 110 may be programmed to maintain the states data of the media devices 115, e.g., states data of an active stream 215, independently from data associated with the media studio 105, e.g., status of communication between the media studio 105 and the media devices 115.

In the present example, the media studio 105 processor 110 is programmed to generate the media output item based on the session state information for an active stream 215. For example, the active session state identifier A2 may include selected media input items 235, 240, 245 for the output item, i.e., rendered as the active stream 215. Thus, the media studio 105 processor generates the media output item including the media input items 235, 240, 245. In other words, the processor 110 may be programmed to suppress provision of the media streams for which state data specifies the potential state, e.g., the media stream 250 is suppressed and not included in the active stream 215, as shown in FIG. 2.

The potential session state may refer to a session state that includes user entries including how to generate the media output item if a request to change the media output item is received, e.g., pushing a soft button specifying "activate potential session state" or the like. The client device 120 may be programmed to, e.g., overwrite, then activate, the state of the active stream 215 with the state data of the potential stream 220. For example, upon activating a potential stream 220, the client device 120 may be programmed to change an active session state having an identifier A2 to include media streams from, respectively, the media input items 235, 240, 250. Thus, advantageously, a client device 120 may use a potential stream 220 to view different media input items (identifier A2), various positions of selected media input items (identifier A4), different image parameters (identifier A5), etc., without disrupting the media output item generation, i.e., the active stream 215, based on the active session state. The changes to the media output item generation may take effect only upon activating the potential stream 220.

TABLE 1

| Identifier | Sub-identifier | Description |
|---|---|---|
| A | | Mixing operation |
| | A1 | Type of media output item, e.g., picture-in-picture, side-by-side, row-on-row, etc. |
| | A2 | State of each media input being selected or not selected. |
| | A3 | Size (height and width) of each selected media input item |
| | A4 | Horizontal and vertical positions H, V of each media item in the media output item |
| | A5 | Image parameters associated with each selected media input item, e.g., color correction, auto exposure, resolution, etc. |
| B | | Object detection and overlay generation |
| | B1 | Classification of overlays, e.g., rectangles, circles, text, arrows, etc. |
| | B2 | Type of tracked objects, e.g., human, vehicles, animals, etc. |
| C | | Output configuration |
| | C1 | Viewers of the media output item |
| | C2 | Storage device allocated for storing the media output item stream |

As stated above, the session may end based on disconnecting the client device 120 from the network 140, minimizing the application window 210, etc. The client device 120 typically lacks programming to store the session states, e.g., in the client device 120 memory. Thus, upon a next start of a session, e.g., by maximizing the application window 210, the client device 120 will lack session state information to reproduce the window 210, including streams 215, 220, on the client device 120. In another example, when a second client device 120 opens an application window 210, the second client device 120 typically lacks the master and session states, which can advantageously be provided from the media studio 105 as described herein so that a user need not re-enter inputs to recreate a window 210.

In one example, the media studio 105 processor 110 may be programmed to receive one or more media streams, each from a respective one of one or more media capture devices, e.g., cameras 125. The processor 110 may be further programmed to receive, from a client device 120, for each of the one or more media streams, state data including at least one of an active and a potential state of the media stream. The processor 110 may be programmed to disconnect from the client device, e.g., upon turning off the client device 120, and then, upon reconnecting to the client device, provide the media streams and/or the state data to the client device 120. Thus, advantageously, as an example, a client device 120 user may not need to re-enter inputs to restore the potential stream 220, because information to render it is stored in and provided from the session state. In one example, connecting and reconnecting with the client device 120 occurs when an application that receives the media streams is activated, e.g. opened, on the client device 120.

The processor 110 may be programmed to generate a media output stream, e.g., based on an active stream 215, based on the active session state and to provide the generated media output stream to one or more client devices 120, viewer(s) 130, and/or a storage device 135, e.g., referring back to Table 1, based on data included in identifier C2 of the active stream 215 data).

In another example, the processor may be programmed, upon reconnecting to a second client device 120, provide the media output stream to the second client device 120. For example, a first client device 120 sends control commands to the media studio 105 based on the session state data of the first client device 120. Upon, e.g., turning on the second client device 120, the media studio 105 processor 110 may transmit the media output stream, that is generated based on commands received from the first client device 120, to the second client device 120. Additionally or alternatively, the processor 110 may be programmed to, upon reconnecting to the second client device 120, provide the state data to the second client device 120. Thus, advantageously, a second client device 120 may be able to collaborate with a client device 120 user by, e.g., adding further input to the potential stream 220 which is then stored by the media studio 105 as part of the applicable session state for the stream 220. For example, the client device 120 may have selected the media input items 235, 240, 250 to be included in the potential stream 220 state, as shown in FIG. 2. In this example, the second client device 120 user, upon receiving the potential stream 220 session state data from the media studio 105, may input data such as an image auto exposure setting (identifier A5) without a need to enter other data of the potential stream 220 session state that were entered by the first client device 120 user.

The session states may include any of the information specified in Table 1, e.g., a horizontal and/or vertical position H, V of the media input items in the media output stream. However, Table 1 is merely an example; additionally or alternatively, a session state may include other information associated with the media output stream.

In one example, based on an instruction received from the client device 120, the processor 110 may be programmed to stream the media output item (the active stream 215) to an output device, e.g., a recording device such as the storage device 135, a display device such as a viewer 130, and/or a web-based streaming service.

In one example, where the media output stream is transmitted to a storage device 135, the processor 110 may be programmed to predict an event such as a storage device 135 memory overflow. In the present context, and "event" is a triggering of a notification that a condition has been met in the media studio 105 and/or a device 120, e.g., a threshold quantity of data has been exceeded, a hardware limitation has been met, etc. An event can be included in master session state data.

For example, the processor 110 may be programmed to predict a memory overflow event based on the media output stream attributes such as image and/or audio resolution, available storage in the storage device 135, etc. For example, the media stream 215 may include 100 megabytes of media data per minute that is stored in a media storage device 135. The processor 110 may be programmed to predict the storage device 135 memory overflow when the memory overflow may occur in less than a time threshold, e.g., 5 minutes. For example, the processor 110 may predict the memory overflow when 500 megabytes of memory are available in the storage device 135 (at a rate of 100 megabytes per minute, the available memory will be full within 5 minutes). However, if the client device 120 session has terminated, e.g., the application window 210 is minimized, then the processor 110 may lack an ability to output the predicted event to the application window 210. Therefore, upon determining that the client device 120 failed to display the sent data, the processor 110 may be programmed to save the outputted predicted event data in the media studio 105 memory and/or a remote server as part of the master session state for the client device 120. The processor 110 may resend the data to the client device 120, upon determining that the client device 120 and the media studio 105 are reconnected. Additionally or alternatively, the processor 110 may be programmed to resend the data upon determining that an application associated with controlling the media studio 105 is activated on the client device, e.g., application window 210 is opened.

As described above, a client device 120 may lose session state data after disconnecting from the media studio 105, e.g., upon minimizing the application window 210, turning off the device 120, etc. In one example, the client device 120 may be programmed to request the state data from a server such as the media studio 105 upon determining that the client device 120 lacks state data for at least one input media stream being received from the media studio 105 and/or other server computer. The client device 120 may be further programmed to restore media streams 215, 220 based on the received state data from the media studio 105 and/or other computer.

The client device 120 may be programmed to determine the states of the media streams 215, 220 based on user input. For example, the user input may include any of the information as described in Table 1. The client device 120 may be programmed to receive user input via touch screen user interface 205. The client device 120 may be further programmed to send the session states of the client device 120 to, e.g., the media studio 105.

The client device 120 may be programmed to output an instruction to change a state of the media stream 215, 220 based on received user input. For example, based on receiving an input from the client device 120 user including a request to activate the saved session state of a potential stream 220, the client device 120 may be programmed to transmit an instruction to the media studio 105 to, e.g., include media input items 235, 240, 250 in the media output stream, as shown in FIG. 2. Here should be noted that FIG. 2 shows the streams 215, 220 prior to activating the potential stream 220 state. After activating the potential stream 220 state, in one example, the data of active session state 215 is overwritten by the potential stream 220 state, and the potential stream 220 may be empty. As another example, an instruction may include a change of viewers 130 and/or display devices assigned for the media output stream (identifier C2 of Table 1). Thus, the client device 120 may be programmed to activate or deactivate a second client device 120, monitor display, recording device, etc., as output device for the media output stream. The media studio 105 processor 110 may be programmed to transmit the media output stream to the assigned output devices based on the received instruction.

Processing

Figure 3:
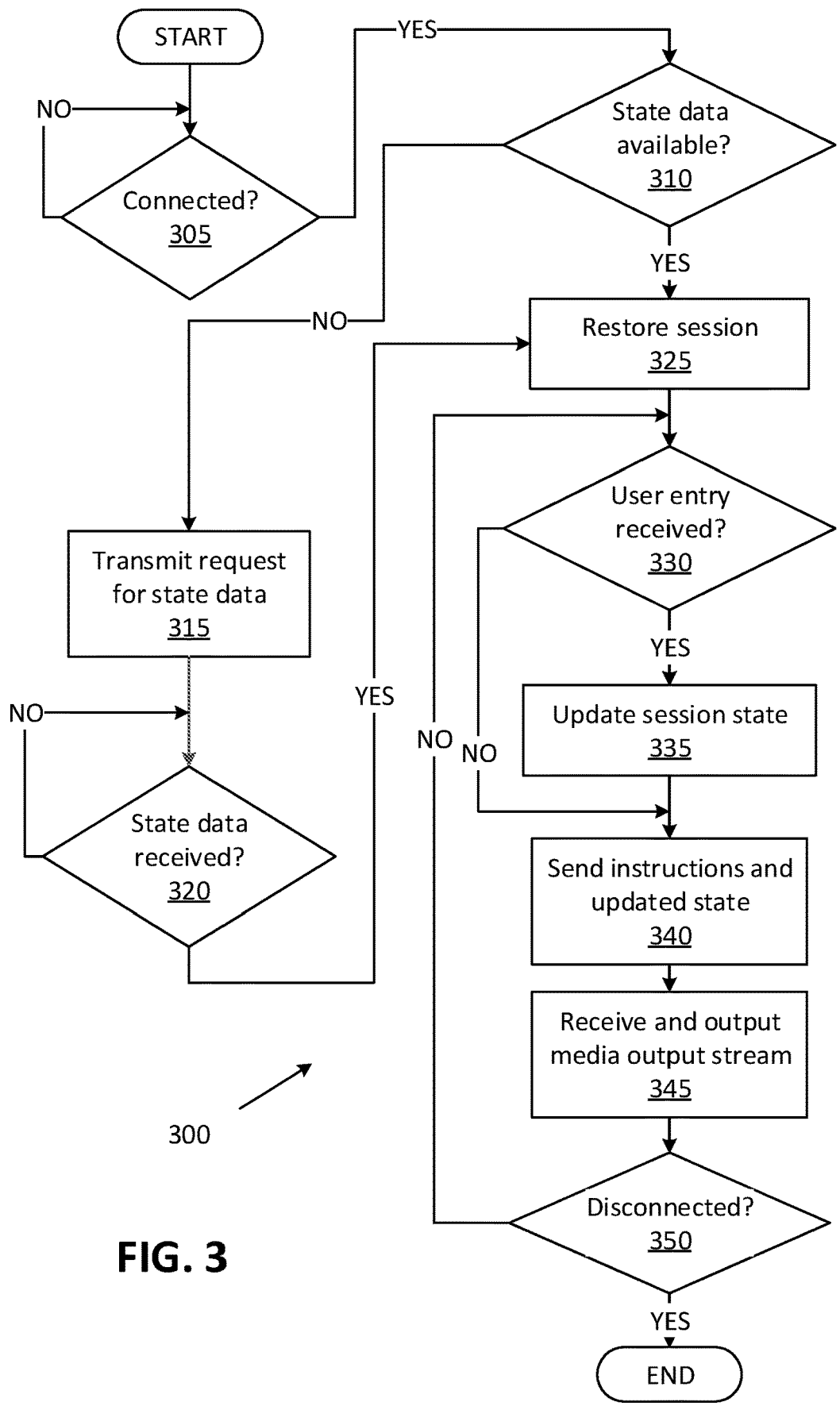
FIG. 3 is a flowchart of exemplary process for a client device controlling a media studio.

FIG. 3 is a flowchart of exemplary process 300 for a client device 120 that controls the media studio 105. In one example, a client device 120 may be programmed to execute blocks of the process 300.

The process 300 begins in a decision block 305, in which the client device 120 determines whether the client device 120 is connected to the media studio 105, e.g., via a wired or wireless network 140. In one example, the client device 120 determines that the client device 120 is connected to the media studio 105 only when an application window 210 that is associated with controlling the media studio 105 is open, e.g., maximized on the user interface 205. If the client device 120 determines that the client device 120 is connected to the media studio 105, then the process 300 proceeds to a decision block 310; otherwise the process 300 returns to the decision block 305.

In the decision block 310, the client device 120 determines whether the session state data are available. For example, the client device 120 may be programmed to determine whether session state data associated with streams 215, 220 are saved in the client device 120 memory and/or are accessible by the client device 120. If the client device 120 determines that the state data are available, then the process 300 proceeds to a block 325; otherwise the process 300 proceeds to a block 315.

In the block 315, the client device 120 transmits a request for state data to the media studio 105 and/or a remote server.

Next, in a decision block 320, the client device determines whether the state data were received. For example, the client device 120 may be programmed to determine whether a reply was received from the media studio 105 that includes the state data, e.g., concerning one or more streams 215, 220. Additionally or alternatively, the client device 120 may be programmed to determine whether current state data of the media studio 105 and/or other information such as predicted events data was received from the media studio 105. If the client device 120 determines that the state data were received, then the process 300 proceeds to a block 325; otherwise the process 300 returns to the decision block 320.

In the block 325, the client device 120 restores the window 210 to include the streams 215, 220 and/or other attributes, e.g., a size, orientation, position, etc., of the window 210 that could be saved in the master state data.

Next, in a decision block 330, the client device 120 determines whether user input is received. For example, the client device 120 determines whether user input via touch screen user interface 205 was received. In one example, the client device 120 may be programmed to receive user input resulting in a change to state data, e.g., any of the state data as described in Table 1. If the client device 120 determines that the user entry is received, then the process 300 proceeds to a block 335; otherwise the process 300 proceeds to a block 340.

In the block 335, the client device 120 updates the session states based on the received user input. In one example, the client device 120 may be programmed to change any of data, e.g., size of a media stream (identifier A3 as described in Table 1). In another example, the client device 120 may be programmed to activate the potential stream 220 state based on a received user input including an activation request.

In the block 340, the client device 120 sends an instruction and/or updated session states data to the media studio 105. For example, the client device 120 may be programmed to send information including the updated session states data to the media studio 105, e.g., vie the network 140.

Next, in a block 345, the client device 120 may receive a media output stream from the media studio 105 and displays the received media stream, e.g., via the user interface 205.

Next, in a decision block 350, the client device 120 determines whether the client device 120 is disconnected from the media studio 105 and/or a remote server. For example, the client device 120 may be programmed to determine that the client device 120 is disconnected from the media studio 105 upon determining that, e.g., the application window 210 is minimized, the client device 120 is turned off, the network 140 connection has failed, etc. If the client device 120 determines that the client device 120 is disconnected, then the process 300 ends, or alternatively, returns to the decision block 305; otherwise the process 300 returns to the decision block 330.

Figure 4A:
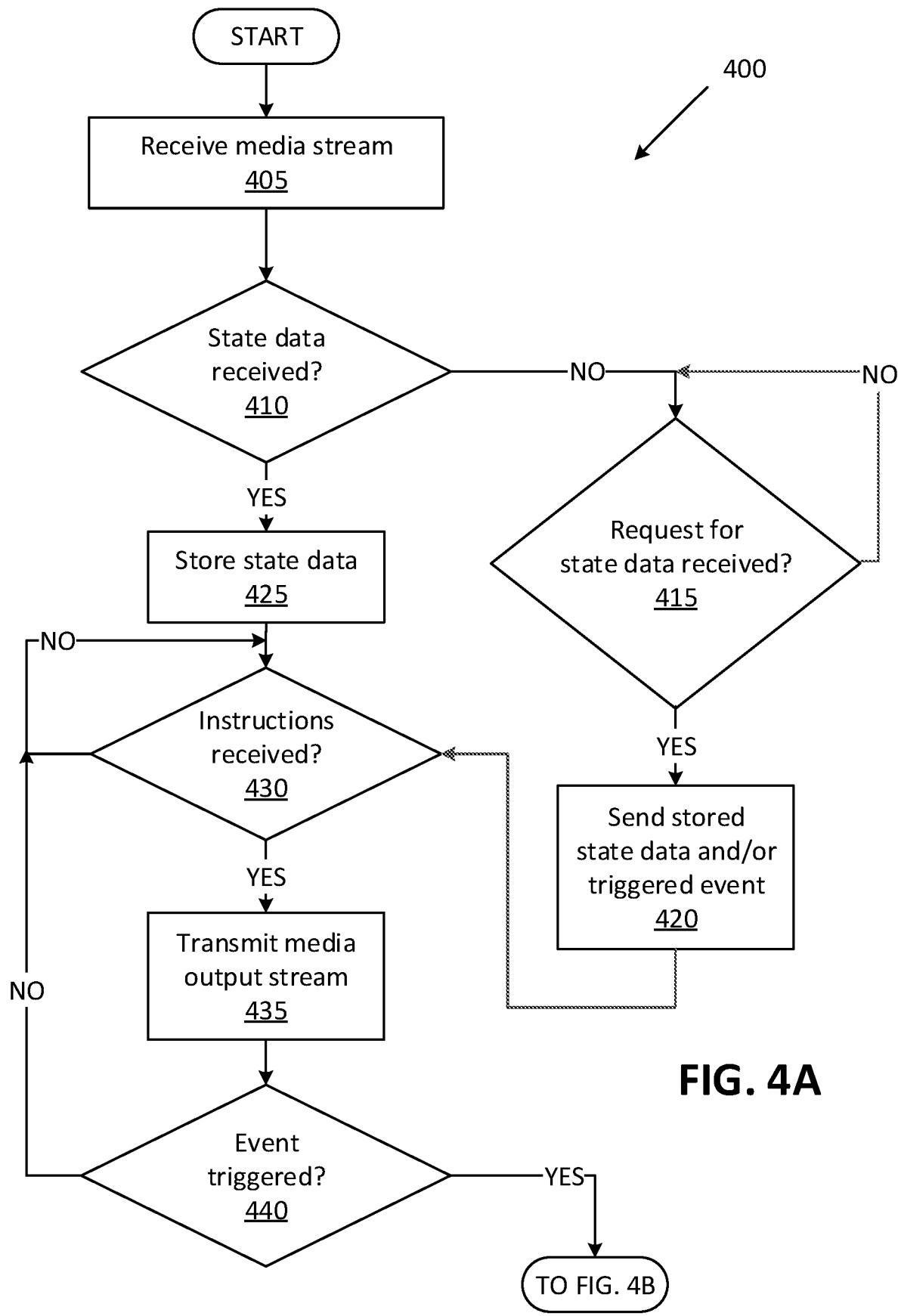
FIGS. 4A-4B are a flowchart of an exemplary process for a media studio receiving control commands from a client device.
Figure 4B:
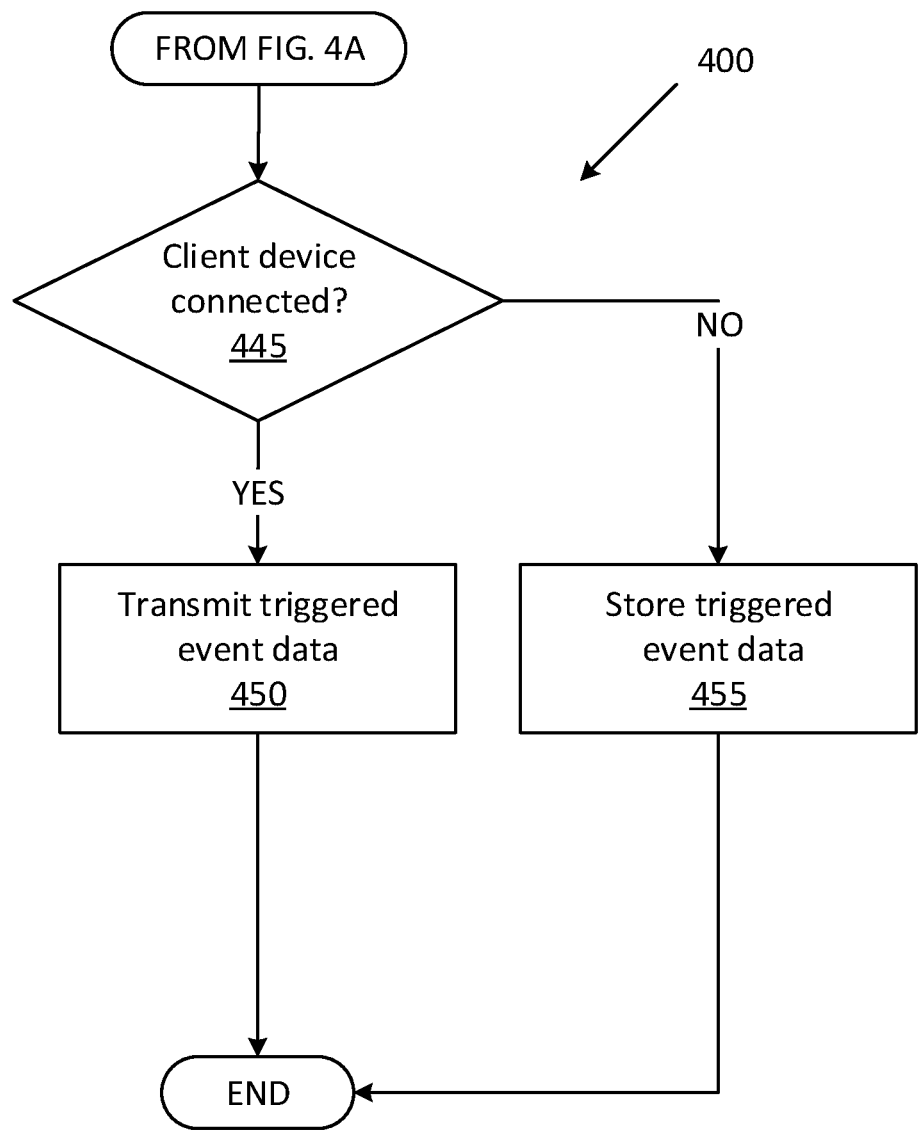

FIGS. 4A-4B are a flowchart of an exemplary process 400 for the media studio 105 receiving commands and/or other data from a client device 120. In one example, the media studio 105 processor 110 may be programmed to execute blocks of the process 400.

With reference to FIG. 4A, the process 400 begins in a block 405, in which the processor 110 receives media stream(s), e.g., via the network 140. For example, the processor 110 may be programmed to receive media input items 235, 240, 245, 250 from multiple cameras 125.

Next, in a decision block 410, the processor 110 determines whether the states data were received, e.g., from a client device 120 via a wireless network 140. If the processor 110 determines that the state data were received, then the process 400 proceeds to a block 425; otherwise the process 400 proceeds to a decision block 415.

In the decision block 415, the processor 110 determines whether a request for the state data were received, e.g., from a client device 120. If the processor 110 determines that a request for the state data was received, then the process 400 proceeds to a block 420; otherwise the process 400 returns to the decision block 415.

In the block 425, the processor 110 stores the received state data, e.g., in a media studio 105 memory, a cloud server, etc.

Next, in a decision block 430, the processor 110 determines whether a command or instruction is received from a client device 120. Such command or instruction may include a request to generate media output stream based on the updated session states, a request to transmit the generated media stream to another viewer 130, a second client device 120, etc. If the processor 110 determines that an instruction is received, then the process 400 proceeds to a block 435; otherwise the process 400 returns to the decision block 430.

In the block 435, the processor 110 generates and transmits media output stream based on the received active session state. In one example, the processor 110 may be programmed to transmit the generated media stream 215, 220 to the devices included in the identifier data C1, C2 of the state.

Next, in a decision block 440, the processor 110 determines whether an event is triggered. For example, the processor 110 may be programmed to determine whether a storage device 135 assigned for storing the generated media stream will be full, given a current rate of streaming, within a time less than a time threshold, e.g., 5 minutes. If the processor 110 determines that an event is triggered, then the process 400 proceeds to a decision block 445 (see FIG. 4B); otherwise the process 400 proceeds to the decision block 430.

With reference to FIG. 4B, in the decision block 445, the processor 110 determines whether a client device 120 is connected to the media studio 105. For example, the processor 110 may be programmed to determine whether the client device 120 and the media studio 105 are communicatively connected via the network 140. If the processor 110 determines that the client device 120 is connected to the media studio 105, then the process 400 proceeds to a block 450; otherwise the process 400 proceeds to a block 455.

In the block 450, the processor 110 transmits the triggered event to the client device 120. For example, the processor 110 may transmit the predicted event to the client device 120 to be displayed, e.g., on the application window 210 of the client device 120.

In the block 455, the processor 110 stores the event data in a media studio 105 memory and/or a remote server. Following either of blocks 450, 455, the process 400 ends, or alternatively, returns to the block 405.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising
   one or more processors; and
   one or more memory devices having stored thereon instructions that when executed by the one or more processors cause the one or more processors to;
   receive one or more media streams, each from a respective one of a one or more media capture devices;
   provide application instructions for transmission to a client device, the application instructions operative to display a user interface on a display, the user interface configured to:
     receive, for each of the one of more media streams, state data including at least one of an active and a potential state of the respective media stream; and
     display on the display one or more active media streams and one or more potential media streams corresponding to the state data;
   receive, from the client device, for each of the one or more media streams, metadata pertaining to the media stream and comprising the state data;
   predict a triggering event comprising whether a memory device assigned for storing the one or more active media streams will be full, given a current rate of streaming within a time less than a time threshold;
   output data, including the triggering event, to the client device;
   disconnect from the client device; and
   then, upon reconnecting to the client device, provide at least one of the media streams and the state data to the client device.

2. The system of claim 1, wherein the computer is further programmed to, upon reconnecting to a second client device, provide the media stream to the second client device.

3. The system of claim 2, wherein the computer is further programed to, upon reconnecting to the second client device, provide the state data to the second client device.

4. The system of claim 1, wherein the state data further includes a position of the media stream in a client device user interface.

5. The system of claim 1, wherein the computer is further programmed to, based on an instruction received from the client device, stream the media to an output device that is one of a recording device, a display device, and a web-based streaming service.

6. The system of claim 1, wherein the computer is further programmed to:

save the outputted data in a computer memory, upon determining that the client device failed to display the outputted data; and resend the data to the client device, upon determining that at least one of a new connection between the client device and the computer is established and an application associated with controlling the computer is activated on the client device.

7. The system of claim 1, wherein the computer is further programmed to suppress provision of one or more of the media streams for which state data specifies the potential state.

8. The system of claim 1, wherein connecting and reconnecting with the client device occurs when an application that receives the one or more media streams is activated on the client device.

9. The system of claim 1, further comprising the client device, programmed to request the state data from a server computer upon determining that the client device lacks state data for at least one media stream being received from the server computer.

10. The system of claim 9, wherein the client device is further programmed to:
determine a state for one or more of the media streams based on received user input; and
transmit the determined state for the one or more media streams to the server computer.

11. The system of claim 9, wherein the client device is further programmed to output an instruction to change a state of a media stream based on received user input.

12. The system of claim 9, wherein the client device is further programmed to activate an output device for a media stream based on received user input.

13. A method, comprising:
receiving, at a computer, one or more media streams, each from a respective one of a one or more media capture devices;
providing application instructions for transmission to a client device, the application instructions operative to display a user interface on a display, the user interface configured to:
receive, for each of the one or more media streams, state data including at least one of an active and a potential state of the respective media stream; and
display on the display one or more active media streams and one or more potential media streams corresponding to the state data;
receiving, from a client device, for each of the one or more media streams, metadata pertaining to the media stream and comprising the state data;
predicting a triggering event comprising whether a memory device assigned for storing the one or more active media streams will be full, given a current rate of streaming within a time less than a time threshold;
outputting data, including the triggering event, to the client device;
disconnecting the computer from the client device; and
then, upon reconnecting to the client device, providing at least one of the media streams and the state data to the client device.

14. The method of claim 13, further comprising, upon reconnecting the computer to a second client device, providing the media stream to the second client device.

15. The method of claim 14, further comprising, upon reconnecting the computer to the second client device, providing the state data to the second client device.

16. The method of claim 13, further comprising:
saving the outputted data in a computer memory, upon determining that the client device failed to display the outputted data; and
resending the data to the client device, upon determining that at least one of a new connection between the client device and the computer is established and an application associated with controlling the computer is activated on the client device.

17. The method of claim 13, further comprising suppressing provision of one or more of the media streams for which state data specifies the potential state.

18. The method of claim 13, further comprising requesting the state data from a server computer upon determining that the client device lacks state data for at least one media stream being received from the server computer.

19. A system, comprising
a client device programmed to provide for each of one or more media streams, metadata pertaining to the media stream and comprising state data including at least one of an active and a potential state of the media stream; and
a media studio computer programmed to receive the one or more media streams and the state data, predict a triggering event comprising whether a memory device assigned for storing the one or more active media streams will be full, given a current rate of streaming within a time less than a time threshold, output data, including the triggering event, to the client device, disconnect from the client device, and then, upon reconnecting to the client device, provide at least one of the media streams and the state data to the client device and suppress provision of one or more of the media streams for which state data specifies the potential state.

20. The system of claim 19, wherein the media studio computer is further programmed to:
save the outputted data in a computer memory, upon determining that the client device failed to display the outputted data; and
resend the data to the client device, upon determining that at least one of a new connection between the client device and the computer is established and an application associated with controlling the computer is activated on the client device.

* * * * *

UNITED STATES PATENT AND TRADEMARK OFFICE
CERTIFICATE OF CORRECTION

PATENT NO. : 10,958,951 B2
APPLICATION NO. : 15/871876
DATED : March 23, 2021
INVENTOR(S) : Gajanan Hegde et al.

It is certified that error appears in the above-identified patent and that said Letters Patent is hereby corrected as shown below:

In the Claims

Claim 13, Column 15, Line 48, please delete "a" and insert --the--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*